United States Patent [19]

Szynal

[11] Patent Number: 4,825,582

[45] Date of Patent: May 2, 1989

[54] SUCTION INSECT ERADICATOR

[76] Inventor: James M. Szynal, 88 N. Main St., Florence, Mass. 01060

[21] Appl. No.: 64,671

[22] Filed: Jun. 22, 1987

[51] Int. Cl.⁴ .............................................. A01M 5/08
[52] U.S. Cl. ...................................... 43/140; 43/139; 43/141
[58] Field of Search ................. 43/137, 138, 139, 140, 43/141

[56] References Cited

U.S. PATENT DOCUMENTS

| | | | |
|---|---|---|---|
| 418,385 | 12/1889 | Saltenberer | 43/140 |
| 733,020 | 7/1903 | Ferriott. | |
| 1,243,302 | 10/1917 | Jones | 43/140 |
| 1,244,834 | 10/1917 | Clement. | |
| 1,400,522 | 12/1921 | Cannon | 43/140 |
| 1,480,498 | 1/1924 | Broadwell. | |
| 1,483,795 | 2/1924 | Gibson et al. . | |
| 1,489,214 | 4/1924 | Hickman | 43/140 |
| 1,490,035 | 4/1924 | Shell. | |
| 1,521,424 | 12/1924 | Brownlow. | |
| 1,537,893 | 5/1925 | Smith. | |
| 1,569,196 | 1/1926 | McDaniel. | |
| 1,849,425 | 3/1932 | Guerra | 43/140 |
| 2,111,030 | 3/1938 | Mote | 43/140 |
| 2,201,463 | 5/1940 | Williams et al. | 43/140 |
| 2,346,270 | 4/1944 | Nisbet | 43/141 |
| 2,389,677 | 11/1945 | McCay. | |
| 2,412,181 | 12/1946 | Smith. | |
| 2,419,353 | 4/1947 | Henley. | |
| 2,643,482 | 6/1953 | Wilson. | |
| 4,141,173 | 2/1979 | Weimert et al. | 43/139 |

FOREIGN PATENT DOCUMENTS 0715076 2/1980 U.S.S.R. ............................... 43/140

Primary Examiner—Kurt Rowan
Attorney, Agent, or Firm—Donald S. Holland

[57] ABSTRACT

A vacuum apparatus is disclosed for mechanically removing and destroying insects and related pests from low growing crops. In the preferred embodiment, the apparatus is affixed to a three-point hitch and power takeoff of a standard farm tractor and comprises a dual fan assembly connected by forced air ducts and suction hoses to a plurality of suction shoes. One of the fans forces air through ducts to individual intakes on the shoes, where the air is directed through manifolds down to oppositely aligned blast channels on the lower edges of plant tunnels. These channels lead the forced air current up toward pest receiving outlets in the top center of the interior of each tunnel. Suction hoses, leading from the other fan, apply a partial vacuum to expansion compartments located directly above the pest receiver outlets.

In operation, the eradictor is lowered over parallel rows of plants until the plant tunnels enclose subject plants. As the tractor moves along the rows, forced air is emitted from the blast channels of the suction shoes. It creates an agitating suction current throughout the leaf canopy of each enclosed plant, forcing insects off the plant. Suction draws the pests out of the shoes and into the fan assembly, whereupon they are disintegrated by the spinning blades and discharged back into the plant environment.

1 Claim, 3 Drawing Sheets

SUCTION INSECT ERADICATOR

BACKGROUND OF THE INVENTION

The present invention relates to mechanical devices for removing and destroying insects and related pests from cultivated crops.

Demand for non-chemical methods of controlling insect and related pests has dramatically increased in recent years. Many factors have contributed to discourage reliance exclusively on chemical pesticides. Significant among these are: concern for the environmental impact and consumer health risks of many pesticides; government restrictions on use or availability of certain pesticides; and, development of resistant varieties of pests resulting from prolonged use of pesticides, obliging ever increasing concentrations of the pesticide for effective control.

Scientists are therefore continually searching for new methods of plant pest control in an effort to maintain production while decreasing the risks to both the environment and the consumer. Infrared light, ultrasound, radiation, pheromone traps, injecting natural predators of pests into the plant environment, and integrated pest management are but a few of the general areas of inquiry that merit ongoing research Perhaps a solution lies also in a "refinement of the past".

Before the advent of chemical pesticides, various nonchemical and mechanical pest control systems were utilized in different agricultural systems. Certain techniques for steaming the soil before seeding were common, in an attempt to burn insect eggs and weed seeds. A similar effect was obtained by controlled burning of fields after harvesting of some annual crops.

As mechanized implements dramatically increased tillage and production, so too, plant pests thrived in the vast "monoculture" fields because such large fields disturbed the normal balance of predator and pest. Insects, in particular, became the scourge of large plantings, devastating thousands of acres in a matter of days At the beginning of this century, clouds of "locusts" and similar insect pests darkened the skies over American agriculture.

Perhaps no crop was economically more important at that time than cotton. With powered machinery replacing much of the required manual labor, cotton acreage increased significantly. Simultaneously, the major cotton insect pest, a beetle known as the "boll weevil", became an ever growing threat and major concern for cotton growers.

Because of both the unique characteristics of the boll weevil and the structure of the cotton plant at the time it is susceptible to boll-weevil attack, a mechanized suction technology developed to control the pest. The boll weevil, like most beetles, flies only irregularly, when under extreme alarm or out of food. Additionally, unlike many insects, the boll weevil clings loosely to plants. Consequently, suction devices were especially effective against boll weevils because they did not fly out of the way of advancing, noisy, machines and they were easily dislodged from the plants.

The boll-weevil suction exterminators started as horse drawn machines. Blowers were powered by gears from the pulled wheels, and agitation bars were used to knock the insects off the plants into the paths of advancing shovel or funnel-like suction devices.

Eventually, improved models included handheld suction hoses that were walked along, beside and in front of the pump apparatus. Some exterminators even used screened vacuum chambers (like present day porous bag vacuum cleaners) to prevent sucked debris from contacting the pumps.

As the technology advanced through the 1920's and 1930's, exterminators began to utilize the exhaust or discharge side of the blowers to first direct the fallen insects into the path of the suction scoops and, finally, to agitate the insects off the plant. One such exterminator is described in U.S. Pat. No. 2,201,463 to Williams et al.

Williams describes an insect vacuum with a single-chamber rotary blower attached to a shoe-like suction device (illustrated in FIG. 8 of the present application). The pump's discharge blows air, through a conduit, into the bottom of the shoe, where it is ejected upwardly and inwardly into a plant chamber. The pump's intake is attached to the top of a central collection pipe of the shoe (not shown). It sucks the injected air, along with collected pests and debris, through the pipe and into the pump's impeller chamber, where they are destroyed and chopped by the spinning blades. The insect pieces then pass through the discharge and are "re-injected" into the bottom of the hood. There, the fragments allegedly assist in additional plant agitation by hitting live insects to knock them off the plant and into the suction conduit.

The primary problem with those prior suction exterminators was that their potential for widespread application was inherently limited by the structure mandated for effective boll weevil control. First, those exterminators utilizing hood collectors such as Williams et al., had to be sufficiently tall to adequately enclose the cotton plants. Therefore, they had no ability to apply to lower growing plants such as potatoes, onions or cucumbers. Second, the exterminators utilizing suction funnel or scoop types of collectors had insufficient suction to suck the stronger or smaller insect pests off lower growing plants. Merely increasing the suction of these types of exterminators would cause excessive soil and ground debris to enter and clog the suction lines and pumps.

Additionally, suction exterminator technology was abandoned before two other related problems were solved. All known prior suction exterminators utilized single-chamber blowers or pumps, wherein the insects or debris were either fed into the pumps, to be recycled, such as in Williams et al., or stored in screened manifolds or porous containers. Increasing suction forces of the former inherently caused the recycled debris to sometimes injure the subject plant; and, the "vacuum cleaner" type suffered from constantly decreasing suction forces as the storage reservoirs filled.

Consequently, because of structural limitation, known suction exterminators are inherently incapable of effective application on low growing plants, such as potatoes, onions or cucumbers. Further, for the same reason, they are incapable of applying sufficient suction forces to extract from those low growing plants stronger and smaller pests, such as Colorado potatoe beetles and immature (larval) forms of pest insects and aphids.

Accordingly, it is the general object of the present invention to provide an improved suction insect eradicator that overcomes the problems of the prior art.

It is another general object to provide an improved suction insect eradicator that provides an inexpensive alternative to costly pesticides.

It is a more specific object to provide a suction insect eradicator for removing and destroying strong small insects and related pests from low growing plants, such as potatoes, onions or cucumbers.

It is another object to provide a suction insect eradicator with a highly variable suction current that can be varied to remove insects in their differing stages of development (larval, adult, etc.) without damaging the subject plants.

It is yet another object to provide a suction insect eradicator with a specially designed hood that covers the subject plant and shields the nearby ground to prevent "outside" soil particles or associated debris from being drawn into the exterminator.

It is still another object to provide a suction insect eradicator, commensurate with the above-listed objects, which can be easily affixed to a common farm tractor's rear "three-point hitch" and powered by the tractor's rear "power takeoff" shaft.

The above and other objects and advantages of this invention will become more readily apparent when the following description is read in conjunction with the accompanying drawings.

SUMMARY OF THE INVENTION

An improved suction insect eradicating apparatus is disclosed for mechanically removing and destroying insects and related pests from low growing crops. The apparatus is affixed to a standard farm tractor's rear three-point hitch and powered by the tractor's rear power takeoff shaft.

In the preferred embodiment, the invention comprises a dual fan assembly connected by forced air duct work and suction hoses to plant enclosing suction shoes. The fan assembly includes two centrifugal fans operating in parallel, resulting in an exhaust or discharge opening and a suction or intake opening in both casings of the two fans. Duct work from the exhaust opening of the forward (closest to the tractor) fan channels air to forced air intakes of a plurality of suction shoes.

The forced air intakes of the suction shoes direct the air downward through manifolds to opposed lower edges of plant tunnel portions of the shoes. Each tunnel's lower edges curve inwardly and upwardly, forming blast channels emitting the forced air up toward pest receiver outlets in the roof of the plant tunnels. Suction hoses lead from the top of the pest receiver outlets to the intake or suction opening of the rear fan casing.

In use, the operator adjusts the tractor's traveling and power takeoff speed to develop the appropriate suction force for a specific pest on the particular subject plants. In the field, the suction shoes are lowered over the subject plants and, as the tractor moves forward, the plant tunnels pass directly over the subject plants such that the forced air leaving the blast channels creates an agitating suction current through the subject plants, forcing pests into the pest receiver outlets. Additional suction force applied to the pest receiver outlets through suction hoses from the intake side of the rear fan helps to draw the pests out of the suction shoes, through the suction hoses and into the rear fan. There, the pests are disintegrated by the rapidly spinning fan blades and discharged back into the field through the unimpeded exhaust opening of the rear fan.

BRIEF DESCRIPTION OF THE DRAWINGS

FIG. 8 is a suction shoe of the prior art.

DETAILED DESCRIPTION OF THE PREFERRED EMBODIMENTS

Referring to the drawings in detail, the preferred embodiment of a suction insect eradicator is shown and generally designated by the reference numeral 10. The invention basically comprises an integrally aligned dual centrifugal fan assembly 12 from which forced air ducts 14 lead to a plurality of suction shoes 16a, b, c, d that are connected back to the fan assembly 12 by suction hoses 18a, b, c, d (see FIG. 1). As best shown in FIGS. 4–7, the suction shoes 16a, b, c, d include a forced air intake 20 adapted to receive the air forced through the ducs 14; an interior manifold 22 to direct the forced air downward; a plant tunnel 24 which overlies the subject plants during operation; blast channels 26a, 26b at the lower edges of the central portion of the plant tunnels 24, which form the emission ends of the manifolds 22 to eject the forced air inwardly and upwardly; and, pest receiver outlets 28, in the roof of the plant tunnel 24, to receive the forced air or suction current emitted from the blast channels 26a, 26b and to direct the current out of the suction shoes into the affixed suction hoses.

Figure 1:
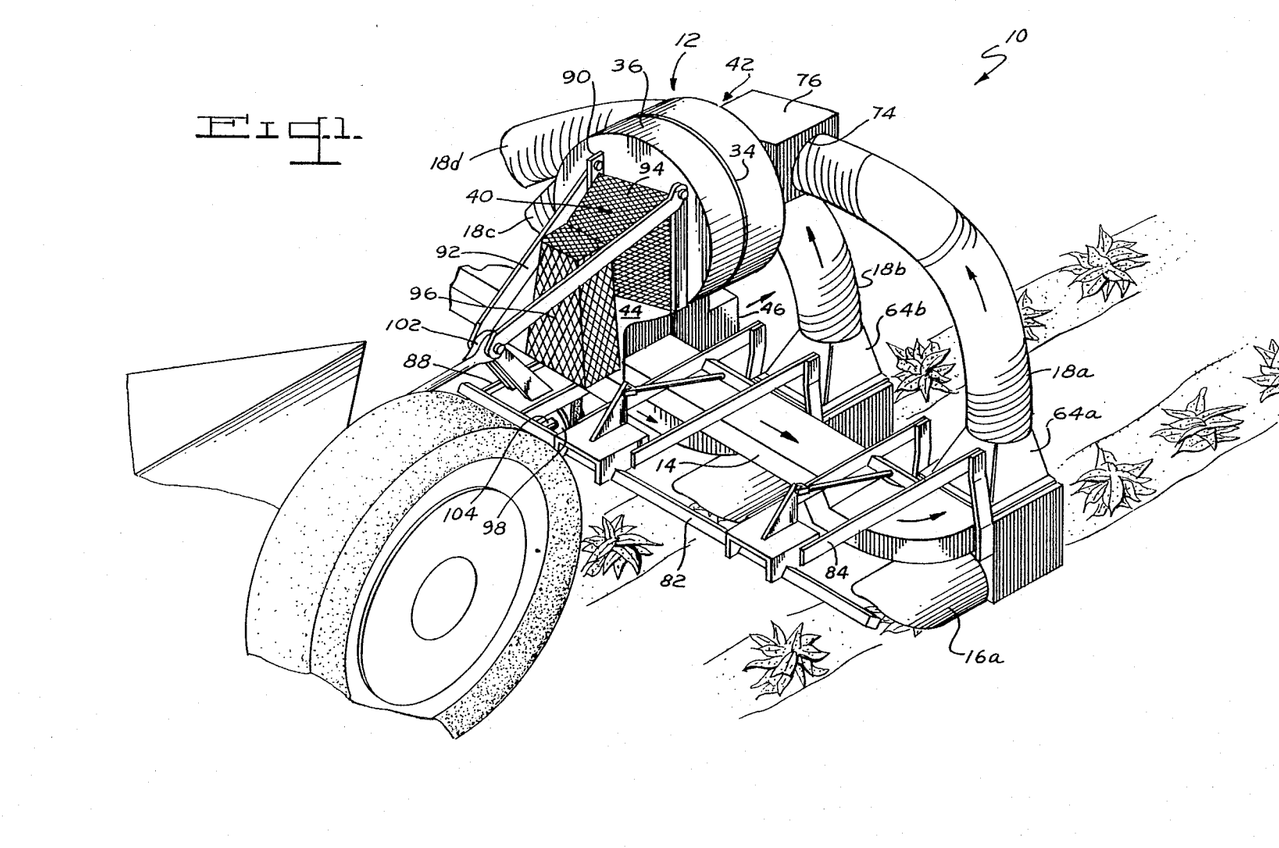
FIG. 1 is a forward top perspective view of a suction insect eradicator constructed in accordance with the present invention, wherein the eradicator is affixed to a standard farm tractor.
Figure 2:
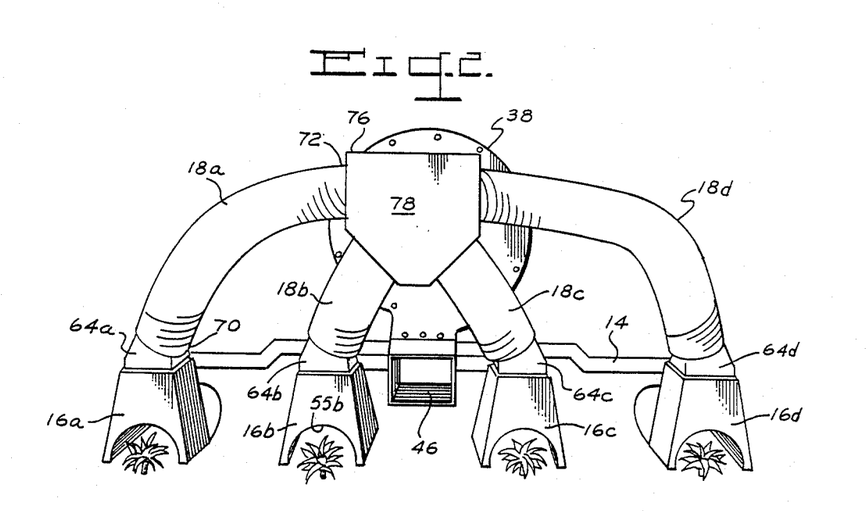
FIG. 2 is a rear plan view of the suction insect eradicator of FIG. 1.

As best shown in FIGS. 1 and 2, the integral centrifugal fan assembly 12 includes a central shaft (not shown) to which two standard sets of impellers or fan wheels are affixed (not shown). The sets are separated from each other by a central wall 34 and each wheel is enclosed within a separate drum-like chamber (36 or 38).

The chamber 36 at the power receiving end of the shaft is called the "forward" chamber 36 and the other is the "rear" chamber 38. Chambers 36, 38 have respective central intake or suction openings, 40, 42. These chambers have side discharges 44, 46 at 6:00.

Forced air ducts 14 of common sheet metal, or other suitable materials, are affixed at one end to the forward chamber discharge outlet 44. They lead at their other ends to the forced air intakes 20 of the suction shoes 16a, b, c, d.

Referring to FIGS. 4–7, each suction shoe 16a, b, c, d is identical and includes a rectangular box or vertical housing 48 overlying the elongated plant tunnel 24. The advancing or forward edge 49 of the plant tunnel is gently curved in an inverse shovel-like manner to reduce possible damage to the plants contacted by the tunnel as it advances. Near the top of the forward face of the box 48 is the rectangular opening 50 of the forced air inlet 20. The opening 50 is surrounded by a protruding ridge 51 for receiving the sleeve-like end of the forced air duct 14.

The wall 52a with the forced air inlet 20, the wall 52b opposite 52a, and the two walls 54a, 54b connecting 52a and 52b form the walls of the box 48. Those four walls 52a, 52b, 54a, 54b, together with the portion of the plants tunnel's e surface that underlies the box, define an enclosed interior manifold 22. It receives the forced air through the opening 50.

The bottom or lower arcuate edges 55a, 55b of the walls 52a, 52b, perpendicular to the direction of travel of the plant tunnel 24, are integrally affixed to the exterior surface of the tunnel. They form the front and rear walls of the manifold 22. The lower flat edges 56a, 56b of the box 48, parallel to and on either side of the lower edges of the plant tunnel 24, curl under and around the edges of the plant tunnel 24 without contacting the tunnel edges. The openings provided thereby are the blast channels 26a, 26b on the bottom of both sides of the central portion of the plant tunnel 24, which channel the forced air out of the manifold 22 and up toward the interior roof of the tunnel (see FIG. 7).

Figure 6:
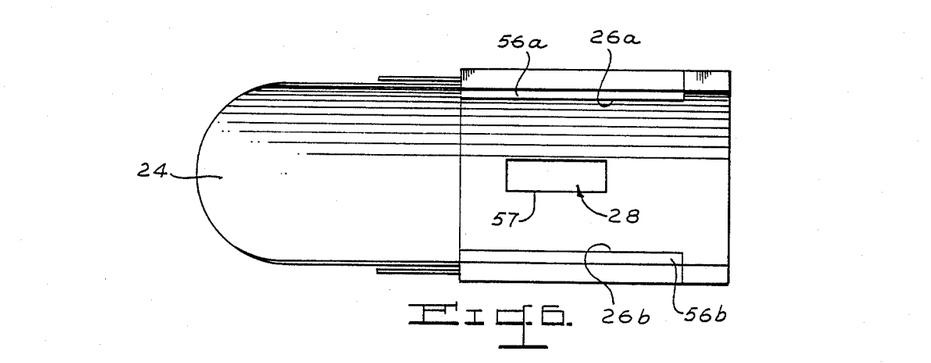
FIG. 6 is a bottom plan view of the suction shoe.

Referring to FIG. 6, a longitudinal slot 57 is located along the center of the interior roof of the plant tunnel 24. It allows the forced air emitted from the blast channels 26a, 26b to enter the pest receiver outlet 28, creating a suction current within the plant tunnel 24. Note that the long sides of this rectangular slot 57 are parallel to the blast channels 26a, 26b.

Above the slot is an expansion compartment 58. It is defined by walls 59a, b, c, d on each side of the slot 57. These walls ascend in an expanding, flared manner, while remaining contiguous with each other. They extend upwardly through the interior manifold 22, to a square opening 60 in the top of the box 48. This top opening 60 has a protruding lip 62 for receiving the sleeve-like end of an adaptor housing (e.g., 64a).

Adaptor housing 64a,b,c,d as best shown in FIG. 2, are rectangular at their lower or intake end 66a,b,c,d and circular at their upper or output end 68a,b,c,d. The output end 68a,b,c,d are also angled slightly toward the suction opening 42 of the rear far chamber 38, and receives the input, sleeve-like end 70 of a suction hose (e.g., 18a).

The suction hoses 18a,b,c,d, are basically identical. Each is cylindrical, flexible, and has a substantially greater interior volume than the forced air ducts 14.

Figure 3:
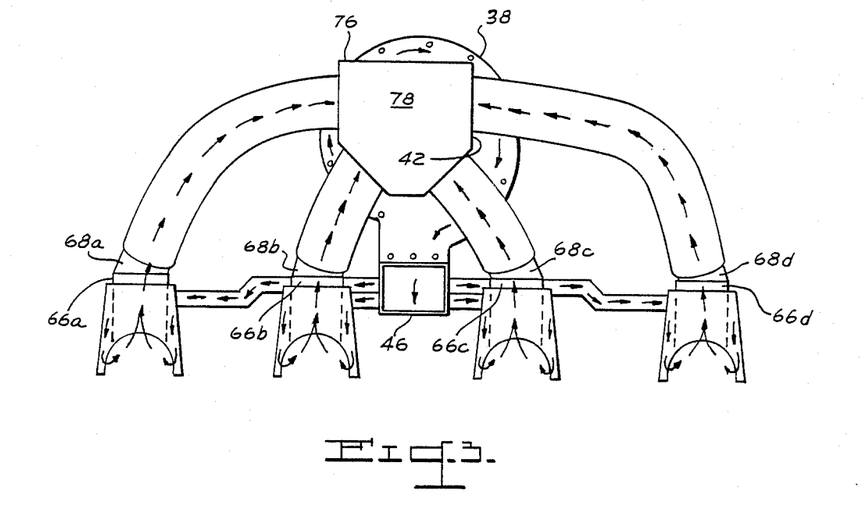
FIG. 3 is another rear plan view, showing flow lines of air passing through the eradicator during its operation.
Figure 4:
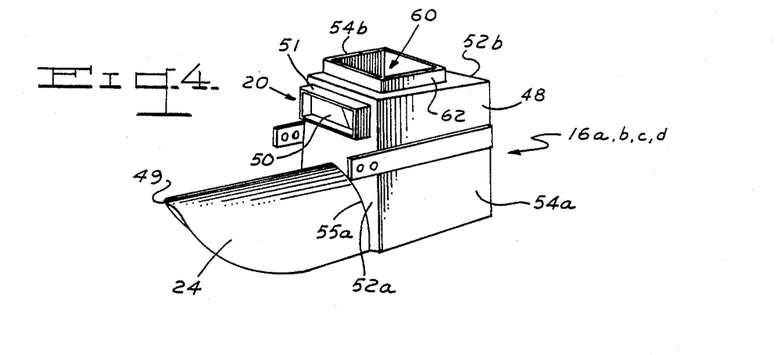
FIG. 4 is a raised perspective view of a suction shoe of eradicator.
Figure 5:
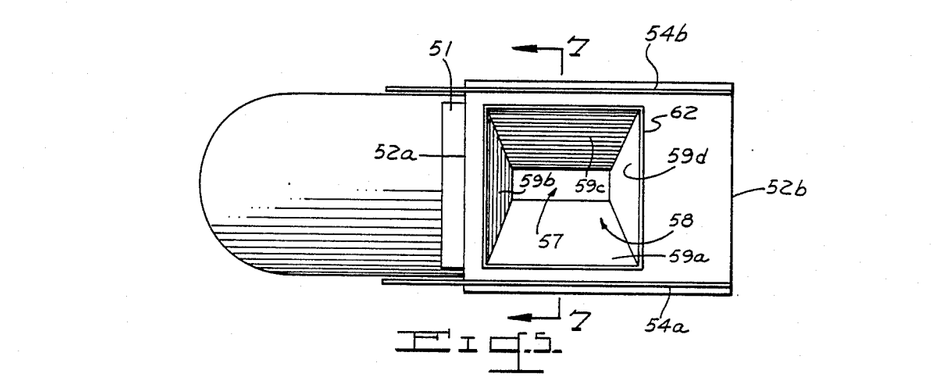
FIG. 5 is a top plan view of the suction shoe of FIG. 4.

The output ends of the suction hoses are affixed to circular openings 74 in the sides of an inlet box 76. The structure of the inlet box may vary depending upon the number of suction shoes utilized. As in FIGS. 2 and 3, where four suction shoes 16a,b,c,d are deployed, the inlet box 76 is a five-sided, box-like structure. It has four sides with circular openings 74 for receiving the output ends 72 of the suction shoes, and an enclosed top. The box's rear wall 78 (i.e., the wall farthest from fan 12) is sealed, and its front wall (not shown) has a circular opening of the same diameter as the centrifugal fan's rear intake 42. The inlet box 76 is affixed to and integral with that opening, thereby permitting air to flow freely from the suction hoses 18, through the inlet box 76 and into the rear chamber 38 of the fan assembly 12.

The rear chamber 38 of fan 12 has an open discharge outlet 46 which faces to the rear, away from the fan 12, between two suction shoes (16b, 16c). This allows for unimpeded exhaust of pest parts and associated debris without interference with the suction shoes, or need for storage and with a minimum of interference of the air flow.

A frame for supporting the suction insect eradicator 10 may vary considerably depending on the number of suction shoes, size of the fan assembly 12, or sensitivity of tracking control desired for the shoes (i.e., in circumstances of uneven terrain). As shown in FIG. 1, a frame for supporting the fan assembly 12, forced air ducts 20, four suction shoes and hoses, may simply consist of a main strut 82 running parallel to the plane of the pulling tractor's drive axle. Extending backward, perpendicular to the main strut 82 and parallel to the ground away from the tractor, is a "U" extension 84 with a descending shoe clamp 86 for supporting each suction shoe 16a, b, c, d.

Each side of the fan assembly 12 casing is supported by a double "I" extension 88, again running backward, parallel to the ground and perpendicular to the main strut 82. Vertical posts 90 reach up along either side of the forward chamber 36 of the fan assembly 12 from the "I" extensions 88, and anchor the blower in the vertical plane. A "Y" extension 92 descends back from the top of both vertical posts 90 to the main strut 82.

As seen in FIG. 1, a heavy screen mesh 94 forms a cage between the "Y" extension 92 and the intake or suction opening 40 of the forward chamber of the fan assembly 12, preventing debris from entering the opening 40. A similar screen mesh forms a protective belt housing 96 around the drive belts leading from the power receiving pulley wheel 98 to the drive wheel (not shown) on the fan assembly's central shaft. The protective belt housing 96 not only keeps debris from interfering with the drive belts, but also protects users from accidental contact with potentially dangerous moving parts.

To "hook up" the suction insect eradicator, a standard farm tractor's "three-point hitch" is connected by slip bolts and cotter pins to mounting brackets 102, two of which extend forward from the main strut 82 and one of which extends forward from the junction point of the two upper branches of the "Y" extension 92 of the frame. The tractor's rearwardly extending "power take-off" shaft 104 is then secured to the power receiving pulley wheel 98. The tractor's hydraulic piston (not shown) raises the three-point hitch, thereby raising the invention, and the suction insect eradicator is ready for transit to the subject plants and operation.

In operation, a user adjusts the transmission and mechanically adjustable throttle of the tractor to the appropriate settings for a particular plant and pest. For young delicate plants, it is likely that a relatively high traveling speed and low power takeoff speed would present the least risk to each plant by exposing it to a low level of suction for a short period of time. Application of the suction insect exterminator to the plants several times may be necessary for effective pest control on such plants. For hardier, more mature plants, higher power takeoff speed, therefore higher suction forces, applied at a low tractor traveling speed, would give much greater control with only one application.

When the desired traveling speed and suction force is set, the user positions the tractor such that the tractor wheels are between the rows of the subject plants (such as potatoes or onions), and the suction shoes are directly over the top of the plants at the beginning of the rows. Utilizing the hydraulic piston of the tractor's three-point hitch, the operator lowers the suction insect eradicator such that the plant tunnels 24 of the suction shoes 16a, b, c, d enclose the subject plant. The operator then drives the tractor at the desired setting along the rows, to the end of the field, repeating the process for all the rows in the field.

The unique structure of the suction shoe produces an extraordinarily powerful, yet responsive, suction force on the subject plants. The forced air emitted from the blast channels 26a, 26b creates a localized turbulence within a subject plant's leaf canopy without disturbing the soil below the plant. The partial vacuum applied to the pest receiver outlet turns the localized turbulence into an agitated suction current passing generally upwardly through the leaf canopy of the subject plant.

A target pest, for example a Colorado potato beetle, would be knocked off a leaf blade by the sharply turbulent air and drawn upwardly by the suction current. As the plant tunnel 24 passes over the subject plant, the longitudinal slot 57 of the pest receiver outlet 28 starts to pass over the target pest. Because the slot 57 is elongated in a direction parallel to the travel of the plant tunnel, maximum suction forces will be exposed to the pest for the longest possible time.

The unique structure of the pest receiver outlet 28 dramatically enhances the suction forces created within the plant tunnel 24. An inherent structural limitation of centrifugal fans of the type utilized in the suction insect eradicator is the mysterious loss of efficiency of the fans resulting from interrupted inlet or suction openings. See *Mark's Standard Handbook For Mechanical Engineers*, pp. 14-73, 74 (7th ed. 1967.) Research has shown that slight occlusions of inlet ducts significantly decrease fan efficiency. Conversely, expanded downstream ducts before the fan inlet create a "Venturi passage" improving fan efficiency.

The suction insect eradicator utilizes such a Venturi passage by means of large suction hoses 18a, b, c, d (significantly wider than the forced air ducts 14) and the oversized inlet box 76. This also allows for a greater equalization of suction forces among a plurality of suction shoes; less turbulent flow; and a decrease in the likelihood of a pest or debris associated clog within the suction hoses.

The tremendous suction forces developed, capable of removing tiny "piercing, sucking" aphid-type insects off of mature plants, largely result, the inventor believes, because the expanded "Venturi passage" begins immediately above the site of the applied suction, in the expansion compartment 58 of the suction shoes 16a, b, c, d.

Additionally, the suction forces are enhanced because the discharge or exhaust outlet of the rear chamber 38 is unimpeded, further increasing the efficiency of the fan assembly 12. Finally, the location of the expansion compartment 58, large suction hoses 18a, b, c, d and oversized inlet box 76 all contribute to an overall decrease in suction side eddy-current turbulence, enhancing laminar flow, which further assists the trapped pests along their path to annihilation.

Although the suction insect exterminator appears similar to very old suction technology, the extraordinary performance achieved results from significantly new developments. The suction force amplification achieved within the expansion compartment 58 (the Venturi passage) of each suction shoe allows for eradication of a broader range of insects and related pests then previously possible. Further, the shallow, yet elongate structure of each suction shoe's plant tunnel 24 allows for pest eradication on low growing crops which the tall structure of the prior art hood, as seen in FIG. 8, could not possibly attain. The suction insect eradicator is therefore extraordinarily effective on the particular plants where the need is currently great, i.e., low-growing food crops such as potatoes or onions.

It should be understood by those skilled in the art that obvious structural modifications can be made without departing from the spirit of the invention. Accordingly, reference should be made primarily to the accompanying claims rather than the foregoing specification to determine the scope of the invention.

Having thus described the invention, what is claimed is:

1. An apparatus for mechanically removing and destroying insects and related pests from low growing crops that comprises;
    a. a frame that is attached to a three-point hitch of a standard farm tractor, whereby the frame is vertically adjustable in height;
    b. a dual centrifugal fan assembly mounted on the frame, said assembly having first and second, integrally aligned, fans with a common drive shaft that is removably connectable to the power takeoff of the standard farm tractor, wherein each fan has an exhaust or discharge opening and a suction of intake opening;
    c. a plurality of suction shoes connected to the assembly via air ducts, wherein each shoe comprises;
        i. a vertical housing having a central passageway that diverges downwardly, wherein the widened top of the passageway is connected to the second fan's intake via duct work;
        ii. said housing having a forced air inlet near its upper portion that is attached to the second fan's discharge via duct work;
        iii. a manifold that extends downwardly from the forced air inlet, on opposite sides of the passageway, whereby a stream of air from the first fan's discharge can be directed through the inlet and down the manifold toward the bottom of the shoe;
        iv. an arcuate plant tunnel having a roof portion underlying said vertical housing, wherein said tunnel is adapted in size to closely enclose the leaf canopy of ground-hugging crops;
        v. a pest receiver outlet for receiving the stream of injected air after it has passed through the crop, said outlet having a longitudinal slot in the roof of the tunnel that forms a passageway for the stream of air into an overlying expansion compartment that creates a venturi passage for encouraging laminar flow of the air stream upwardly to an expanded opening atop the compartment that is adjacent the top of the suction shoe and surrounded by a protruding ridge;
    d. adaptor housings that respectively fit over the ridges atop the shoes to continue the expanded venturi passage, whereby said housings receive the stream of air from the expansion compartment;
    e. suction hoses, continuing the venturi passage, that fit over cylindrical ends of each of the adaptor housings, said hoses having substantially the same diameter as the cylindrical ends; and
    f. an expanded inlet box, continuing the venturi passage, that is attached to the suction hoses and affixed to the suction or intake opening of the second fan, whereby the stream of air is drawn into the second fan to be discharged through the open exhaust or discharge outlet of that fan.

* * * * *

UNITED STATES PATENT AND TRADEMARK OFFICE
CERTIFICATE OF CORRECTION

PATENT NO. : 4,825,582
DATED : May 2, 1989
INVENTOR(S) : JAMES M. SZYNAL

It is certified that error appears in the above-identified patent and that said Letters Patent is hereby corrected as shown below:

The title page should be deleted to appear as per attached title page.

Figure 7:
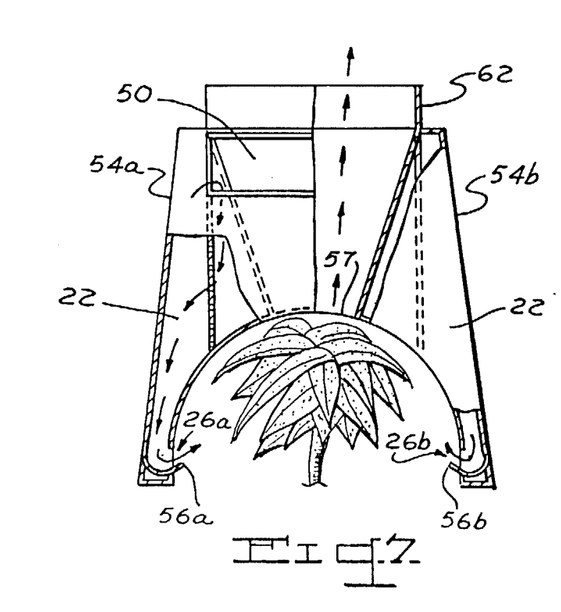
FIG. 7 is a fragmentary cross-sectional view of the suction shoe, taken along line 7—7 of FIG. 4.

The sheet of Drawing consisting of Figures 7 and 8 should be added as per attached sheet.

Signed and Sealed this

Twenty-first Day of August, 1990

Attest:

HARRY F. MANBECK, JR.

Attesting Officer    Commissioner of Patents and Trademarks

United States Patent [19]

Szynal

[11] Patent Number: 4,825,582
[45] Date of Patent: May 2, 1989

[54] SUCTION INSECT ERADICATOR

[76] Inventor: James M. Szynal, 88 N. Main St., Florence, Mass. 01060

[21] Appl. No.: 64,671

[22] Filed: Jun. 22, 1987

[51] Int. Cl.⁴ ............................................. A01M 5/08
[52] U.S. Cl. ................................... 43/140; 43/139; 43/141
[58] Field of Search ................... 43/137, 138, 139, 140, 43/141

[56] References Cited

U.S. PATENT DOCUMENTS

| | | | |
|---|---|---|---|
| 418,385 | 12/1889 | Saltenberer | 43/140 |
| 733,020 | 7/1903 | Ferriott . | |
| 1,243,302 | 10/1917 | Jones | 43/140 |
| 1,244,834 | 10/1917 | Clement . | |
| 1,400,522 | 12/1921 | Cannon | 43/140 |
| 1,480,498 | 1/1924 | Broadwell . | |
| 1,483,795 | 2/1924 | Gibson et al. . | |
| 1,489,214 | 4/1924 | Hickman | 43/140 |
| 1,490,035 | 4/1924 | Shell . | |
| 1,521,424 | 12/1924 | Brownlow . | |
| 1,537,893 | 5/1925 | Smith . | |
| 1,569,196 | 1/1926 | McDaniel . | |
| 1,849,425 | 3/1932 | Guerra | 43/140 |
| 2,111,030 | 3/1938 | Mote | 43/140 |
| 2,201,463 | 5/1940 | Williams et al. | 43/140 |
| 2,346,270 | 4/1944 | Nisbet | 43/141 |
| 2,389,677 | 11/1945 | McCay . | |
| 2,412,181 | 12/1946 | Smith . | |
| 2,419,353 | 4/1947 | Henley . | |
| 2,643,482 | 6/1953 | Wilson . | |
| 4,141,173 | 2/1979 | Weimert et al. | 43/139 |

FOREIGN PATENT DOCUMENTS 0715076  2/1980  U.S.S.R. .................. 43/140

Primary Examiner—Kurt Rowan
Attorney, Agent, or Firm—Donald S. Holland

[57] ABSTRACT

A vacuum apparatus is disclosed for mechanically removing and destroying insects and related pests from low growing crops. In the preferred embodiment, the apparatus is affixed to a three-point hitch and power takeoff of a standard farm tractor and comprises a dual fan assembly connected by forced air ducts and suction hoses to a plurality of suction shoes. One of the fans forces air through ducts to individual intakes on the shoes, where the air is directed through manifolds down to oppositely aligned blast channels on the lower edges of plant tunnels. These channels lead the forced air current up toward pest receiving outlets in the top center of the interior of each tunnel. Suction hoses, leading from the other fan, apply a partial vacuum to expansion compartments located directly above the pest receiver outlets.

In operation, the eradictor is lowered over parallel rows of plants until the plant tunnels enclose subject plants. As the tractor moves along the rows, forced air is emitted from the blast channels of the suction shoes. It creates an agitating suction current throughout the leaf canopy of each enclosed plant, forcing insects off the plant. Suction draws the pests out of the shoes and into the fan assembly, whereupon they are disintegrated by the spinning blades and discharged back into the plant environment.

1 Claim, 4 Drawing Sheets